(12) United States Patent
Baer

(10) Patent No.: US 10,492,090 B2
(45) Date of Patent: Nov. 26, 2019

(54) METHOD AND A MOBILE USER TERMINAL FOR SERVICE QUALITY PREDICTION

(71) Applicant: Telia Company AB, Solna (SE)

(72) Inventor: Anders Baer, Arsta (SE)

(73) Assignee: Telia Company AB, Solna (SE)

( * ) Notice: Subject to any disclaimer, the term of this patent is extended or adjusted under 35 U.S.C. 154(b) by 110 days.

(21) Appl. No.: 15/807,966

(22) Filed: Nov. 9, 2017

(65) Prior Publication Data

US 2018/0139638 A1    May 17, 2018

(30) Foreign Application Priority Data

Nov. 11, 2016   (EP) .................................... 16198395

(51) Int. Cl.
*H04W 24/08*   (2009.01)
*H04L 12/24*   (2006.01)
*H04L 12/26*   (2006.01)

(52) U.S. Cl.
CPC ............ *H04W 24/08* (2013.01); *H04L 41/12* (2013.01); *H04L 41/5067* (2013.01); *H04L 43/067* (2013.01); *H04L 43/0894* (2013.01)

(58) Field of Classification Search
CPC ... H04L 41/12; H04L 41/5067; H04L 43/067; H04L 43/0894; H04L 67/22; H04W 4/02; H04W 24/08; H04W 64/00
See application file for complete search history.

(56) References Cited

U.S. PATENT DOCUMENTS

| 6,421,346 | B1* | 7/2002 | Itoh | H04L 49/254 |
| | | | | 370/395.7 |
| 6,788,700 | B1* | 9/2004 | Nakil | H04L 29/12009 |
| | | | | 370/362 |
| 7,961,726 | B2* | 6/2011 | Wang | H04L 69/24 |
| | | | | 370/389 |
| 8,346,225 | B2* | 1/2013 | Raleigh | H04L 41/0806 |
| | | | | 455/414.1 |
| 8,547,872 | B2* | 10/2013 | Raleigh | G06Q 10/06375 |
| | | | | 370/252 |

(Continued)

OTHER PUBLICATIONS

European Application No. 16198395.2, Extended European Search Report dated May 9, 2017, 11 pages.

*Primary Examiner* — Alpus Hsu
(74) *Attorney, Agent, or Firm* — Kilpatrick Townsend & Stockton LLP

(57) ABSTRACT

The embodiments herein relate to a mobile user terminal (400) and a method performed in the mobile user terminal (400) for predicting the quality of services or applications in a network topology comprising a multi-radio access technology network system. The method comprises monitoring (301) available network interfaces; recording (302) quality characteristics of each available network interface; recording (303) network connection location data for each available network interface; and further recording the date/time of day; collecting (304) user active service(s) and/or active application(s); and building or forming (305) a usage pattern based on: each collected user active service and/or active application; the recorded network connection location data and the recorded date/time of day; and the recorded quality characteristics of each monitored available network interface.

14 Claims, 4 Drawing Sheets

(56) References Cited

U.S. PATENT DOCUMENTS

| | | | |
|---|---|---|---|
| 8,589,541 B2* | 11/2013 | Raleigh | H04L 41/0893 709/224 |
| 8,848,566 B2* | 9/2014 | Dunne | H04L 41/5025 370/252 |
| 8,854,954 B2* | 10/2014 | Dunne | H04L 41/5025 370/228 |
| 8,924,549 B2* | 12/2014 | Raleigh | G06Q 10/06375 709/224 |
| 9,125,225 B2* | 9/2015 | Kadel | H04W 84/005 |
| 9,154,247 B2* | 10/2015 | Altman | H04H 60/04 |
| 9,179,316 B2* | 11/2015 | Raleigh | G06Q 10/06375 |
| 9,247,450 B2* | 1/2016 | Raleigh | H04L 41/0806 |
| 9,271,179 B2* | 2/2016 | Singh | H04W 8/22 |
| 9,451,591 B2* | 9/2016 | Cucala Garcia | H04W 28/08 |
| 9,473,999 B2* | 10/2016 | Hershey | H04W 36/26 |
| 9,942,796 B2* | 4/2018 | Raleigh | H04L 41/0806 |
| 10,051,533 B2* | 8/2018 | Fitzpatrick | H04W 48/18 |
| 2004/0166878 A1* | 8/2004 | Erskine | H04W 4/029 455/456.1 |
| 2011/0171960 A1 | 7/2011 | Hershey et al. | |
| 2013/0035083 A1 | 2/2013 | Kadel | |
| 2016/0037304 A1 | 2/2016 | Dunkin et al. | |
| 2016/0050589 A1* | 2/2016 | Safavi | H04W 36/0033 455/436 |

\* cited by examiner

METHOD AND A MOBILE USER TERMINAL FOR SERVICE QUALITY PREDICTION

TECHNICAL FIELD

The present disclosure relates to the field of wireless communications, and in particular to a method and a mobile user terminal for predicting the quality of services or applications in a network topology comprising a multi-radio access technology network system.

BACKGROUND

Mobile user terminals such as tablets and smartphones having wireless connectivity capabilities to a plurality of radio access technologies such as WiFi, 2G, 3G, 4G, 5G, etc. host a multitude of applications and have access to a wide range of services enabling a user of such a terminal to e.g. browse the Internet, read emails, view video streaming and listen to music streaming etc. While a user of such a mobile terminal is moving in a network topology including a plurality of radio access technologies, the terminal may be handed over from one cell, to which the mobile terminal is attached, to another cell that may take over the connection of the mobile user terminal. However, this is not always the case, and also, there is no guarantee that an active service or application running in the mobile user terminal will continue to be active in the new cell. This may be due to that the bandwidth or throughput provided in the new cell not being large enough to provide such a service or application resulting in an increase in delay or even interruption of the service or application. This leads to an unreliable or unsatisfactory service experience.

One solution to this problem is to buffer data in advance by e.g. manually downloading the desired service/application such as video, music or emails while the network connection is adequate in terms of bandwidth and quality and to consume such service or application when the network connection is bad or non-available. However, this requires a high level of user interaction, which maybe bothersome, especially to a busy user.

SUMMARY

It is an object of embodiments herein to solve the above problems by providing a method performed in a mobile user terminal and a mobile user terminal for predicting quality of services or applications in a network topology comprising a multi-radio access technology network system. According to an aspect of embodiments herein, there is provided a method performed in a mobile user terminal. The method comprising: monitoring available network interfaces; recording quality characteristics of each available network interface; recording network connection location data for each available network interface; and further recording the date/time of day; collecting user active service(s) and/or active application(s); and building or forming a usage pattern based on: each collected user active service and/or active application; the recorded network connection location data and the recorded date/time of day; and the recorded quality characteristics of each monitored available network interface.

According to an embodiment the method further comprises predicting quality of said user active service(s) or active application(s) based on the built or formed usage pattern and further based on an application profile or service profile, when the user of the mobile terminal is moving in a network topology comprising said available network interfaces.

According to another aspect herein, there is provided a mobile user terminal comprising a processor and a memory, said memory containing instructions executable by the processor wherein the mobile user terminal is operative to: monitor available network interfaces; record quality characteristics of each available network interface; record network connection location data for each available network interface; and further record the date/time of day; collect user active service(s) and/or active application(s); and build or form a usage pattern based on: each collected user active service and/or active application; the recorded network connection location data and the recorded date/time of day; and the recorded quality characteristics of each monitored available network interface.

According to an embodiment, the mobile user terminal is further operative to store the recorded quality characteristics; the recorded network connection location data; the recorded date/time of day and information on user active service(s) and/or active application(s), and the built or formed usage pattern for each user active service or application.

According to an embodiment, the mobile user terminal is further operative to predict quality of said user active service(s) and/or active application(s) based on the built or formed usage pattern and further based on an application profile or service profile, when the user of the mobile terminal is moving in a network topology comprising said available network interfaces An advantage with some embodiments herein is to reduce delay experienced by a user of a service or application.

Another advantage may be to provide the user the desired service or application independently of the network conditions.

Another advantage of some embodiments herein is to minimize user interaction for a desired service or application.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
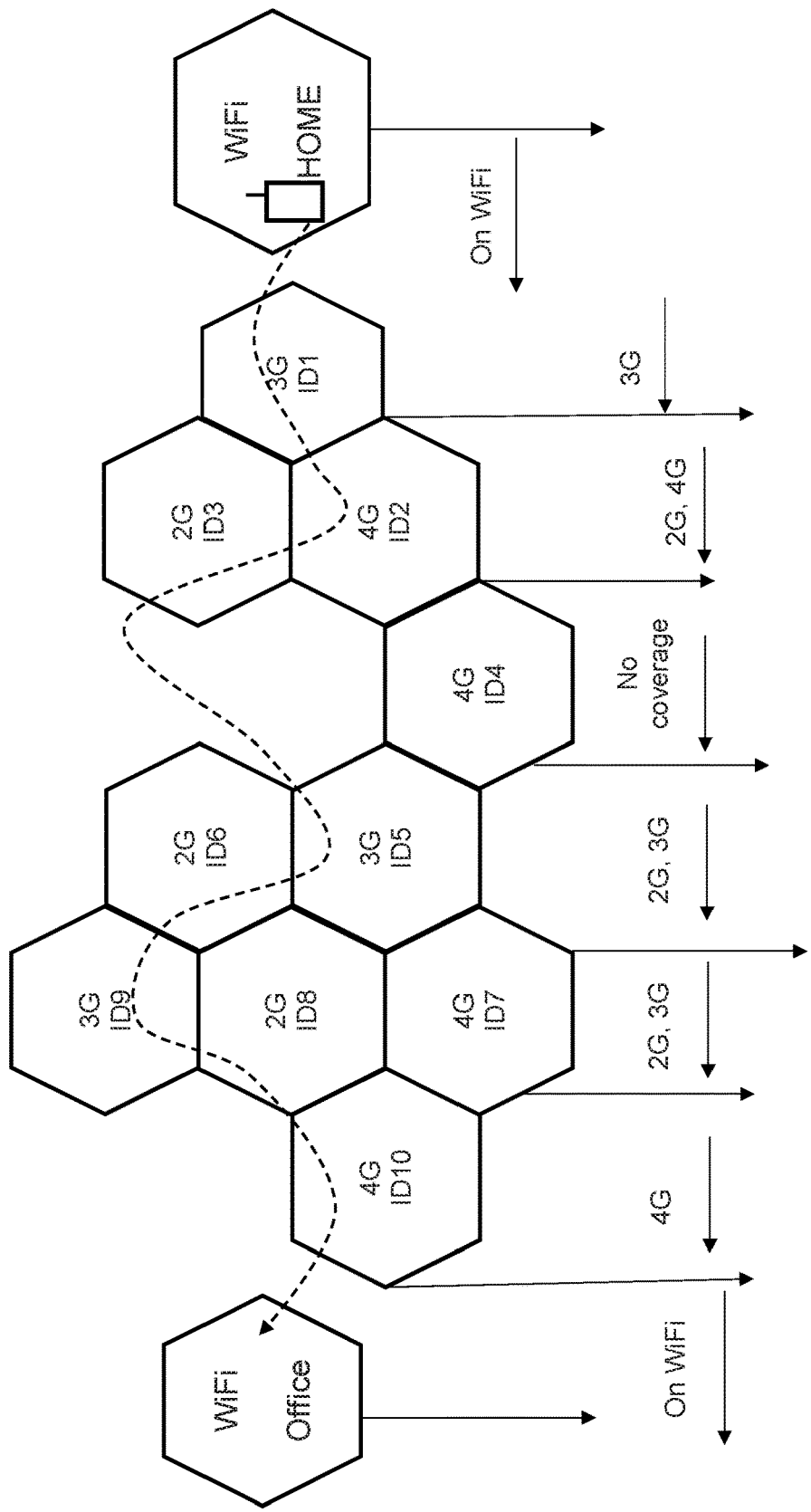
FIG. 1 is an example scenario of a network topology showing the path through which a user of a mobile terminal travels from a home environment to an office environment.

Referring to FIG. 1, there illustrated an example of a network scenario wherein embodiments herein may be employed.

For the sake of simplicity, it is here assumed that a user of a mobile terminal is located at home that is provided with a WiFi network with good coverage in terms of bandwidth or throughput. In other words, the user, while being in the home environment, may use or start any desired application or service and normally the service experience for the user is satisfactory.

As depicted in FIG. 1, when the user is travelling from the home environment to the office environment, the user may pass through a network topology that includes multiple different network areas each may support a radio access technology, for example 2G, 3G, 4G, 5G, etc. Each cell in FIG. 1 is here identified by a unique cell identification number (ID). Cell having ID1 is a 3G cell, cell with ID2 is a 4G cell, cell with ID3 is a 2G cell etc.

Hence, as the user is travelling or moving from home to the office, the mobile user terminal may be subject to different radio access technologies to which it may be connected.

The path or route that the user is taken is shown in FIG. 1 in dashed line, and the networks to which the mobile user terminal may be connected are also shown.

It should be mentioned that the path or route that the user is taken on a daily basis is most likely the same.

Even though there is inbuilt technology in the radio networks to handle handover scenarios between different network technologies, there is no guarantee that secures the services or applications that are active in the mobile user terminal continue to work throughout the path, as previously described. For example, it is shown in FIG. 1 that the user not only is passing between multiple networks but also in an area where there is no network coverage as indicated in FIG. 1. Hence in such a situation, and depending on the service/application used by the user, it is most likely that the service or application stops working.

In the following, exemplary embodiments will be described that solve the above problem.

For a user (or a mobile user terminal) moving between different areas there will be patterns of those movements over time. Those patterns together with collected measurements may be used, according to embodiments herein, to predict problem areas ahead. An example of a problem area is the "non-coverage area" shown in FIG. 1. Another example of a problem area is where the bandwidth provided in an area or cell, although the mobile user terminal is in-coverage, is too low to support the desired service or application. When such areas are identified, this information may be provided in advance to any of the application or service that is used by the user to be able to adapt and prepare for the service or application to still continue to work as desired independently of the quality of the network interface experience by the user.

To achieve this and according to embodiments herein there is provided a method performed in a mobile user terminal which includes: monitoring available network interfaces (e.g. 2G network interface, 3G network interface, 4G network interface, 5G network interface, WiFi network interface, etc.); and recording quality characteristics of each available network interface. Examples of quality characteristics of a network interface are: signal quality measured by the mobile user terminal, bit error rate, network fault codes, jitter, lost data packages, latency, applications faults, available bandwidth and throughput offered by the network interface. The method also includes recording network connection location data for each available network interface and recording the date/time of day. An example of a network location data is the cell identification number and/or the network interface identification network and/or the geographical location of the mobile user terminal and/or GPS data. The method also includes collecting of user active services and/or active applications that the user e.g. daily, desires to consume. Example of such a service or application is web browsing, email service, video streaming, music streaming, etc.

The data information above i.e. the collected user active service(s) and/or active application(s), the recorded network connection location data, the recorded day/time of day, the recorded quality characteristics of each monitored network interface, and the usage pattern (see below) may then be stored or cached locally in the mobile user terminal or may be sent to a network central (service) device from which it may be distributed to other devices or mobile terminals belonging to the user or to other users. For example, for a given location or position that a specific user previously has not visited, the network (service) device may distribute such stored data information for the given location to that specific user or to other users that already visited the area. The distribution of such data may be pushed to the mobile user terminal(s), or the user(s) may download such data when desired. In other words, the other users may subscribe to this stored information to know when to cache and/or to prepare data and for how long.

The method further comprises building or forming a usage pattern based on the above data information. The usage pattern may also be stored locally in the device and/or be stored in the network service device as explained above and be distributed to other users via a service.

This way, a pattern of user service and/or application will be available, i.e., when a service or application is used, where it is used, and how it is used. This is in order to predict where/when a service or application is experiencing problems. In addition, an application profile or user profile is also used in the prediction. The application profile may include specifics, e.g., the bandwidth required for acceptable service experience up to satisfactory service experience, latency needed for acceptable service experience up to satisfactory service experience, processor capacity needed (CPU %) for the application to run, etc. The application profile may also be stored as explained above and be distributed via the network service device to other users.

As an example, the built usage pattern and the application or service profile may be used to determine when one or more specifics of the application profile is predicted to not be met (e.g. the latency is too long for a given location). Then, action to mitigate this prediction may be taken by increasing the buffering time or pre-downloading webpages or emails prior to entering the "problem area". This action to mitigate may include proposing or selecting an alternative way of direction to an application of the mobile user terminal which may be displayed to the user in the user interface of the mobile terminal.

The prediction hence may take advantage of a service or application reporting back one or more specifics of the application or service profile, for example, what bandwidth, latency etc. is experienced for the specific application. The application or service profile may also include as a specific a validity timer defining how long a pre-downloaded data is "valid" before it is updated in order to meet user expectation.

When a mobile user terminal is then following a previously known path or route, e.g. travelling from home to work, the method described above allows prediction of "problem areas" where the quality of a service or application is considered non-satisfactory in terms of e.g. quality of the wireless interface and also when one or more specifics of the application profile are not met as explained before. The method also allows prediction of areas where the quality of service or application is instead considered satisfactory.

The method comprises predicting the quality of the user active services and/or active applications based on the built or formed usage pattern and also based on the application profile, when the mobile user terminal is moving in a network topology, e.g., from home to work.

Such a usage pattern and application or service profile allows adapting the buffering time of the user service or application when the predicted quality of the user service and/or application is determined, according to the usage pattern, to be non-satisfactory and to not meet at least one specific or requirement of the application or service profile. As an example, the predicted quality is determined to be non-satisfactory when it is below a service quality threshold according to the usage pattern and when the bandwidth or latency of the application is not met.

For example, assume that the user active service and/or active application is music or video streaming and the mobile user terminal is located in an area or cell where the signal quality is good or even excellent, i.e., satisfactory. In the event the built usage pattern indicates that the next area or location or cell is a "problem area," i.e., the signal quality is non-satisfactory and that one or more specifics or the application will not be met in the problem area, the usage pattern and the application profile are configured to notify the service or application about the predicted quality ahead. This triggers an increase in the buffering time of the streaming service to, e.g., X seconds in order to cover for the upcoming "problem area". This is performed prior to entering the problem area. The length of the buffering time may take any appropriate value, e.g., ranging from 20 seconds to several minutes depending on the amount of time the mobile user terminal is within the "good area" and also depending on the amount of data to be buffered. This way, the user of the mobile terminal will not experience disruption of the service or application when the user is located in the "problem area". In other words, service or application continuity is achieved and delay is reduced.

If the user active service or application is instead web browsing and/or email, pre-downloading web pages and/or emails may be done prior to entering the area or location wherein the predicted quality of said user active service(s) and/or active application(s), based on the built usage pattern, is determined not to meet at least one requirement or specific of the application profile or service. This allows the user, when entering the "problem area", to continue browsing the pre-downloaded web pages and/or read the pre-downloaded emails. Note that if the user of the mobile terminal is browsing a news site and never browses a sports site, the sports site preferably should not be pre-downloaded prior to entering the problem area, but instead news sites are downloaded. Hence information of the application or service may be part of the usage pattern.

Below is a table illustrating an example of a usage pattern. Here it is assumed that the route taken by the mobile user terminal is from home to the office. The location of the mobile user terminal is shown, followed by the quality of network interface of each location through which the mobile user terminal passes, the time of day, the service or application used and the prediction logic. As shown, when the geographical location of the mobile user terminal is in a 4G cell (ID2), the quality is considered excellent, and the available bandwidth/throughput is relatively high. Hence the user may run any desired application e.g. Web browsing and streaming. The next location is ID3 which is a 2G cell. Even if the channel quality is adequate or average, the available bandwidth or throughput of the 2G cell may not fulfill the requirement(s)/specific(s) of the service (video or music streaming) according to the service profile. According to some embodiments herein, the usage pattern predicts that cell ID3 does not fulfill the bandwidth required by the service according to the service profile (e.g. low bandwidth). The service or application is then notified about the predicted quality/bandwidth ahead. This triggers an adaptation of the buffering time for covering for the low bandwidth while the mobile user terminal is in cell ID2. For example, the buffering time is increased to 180 seconds on video streaming. Therefore, when entering the ID3 cell, the quality of the video will still be satisfactory.

TABLE

USAGE PATTERNS-EXAMPLE (HOME TO OFFICE)

| LOCATION | QUALITY OF NETWORK INERFACE | TIME OF DAY | SERVICE/ APPLICATION | PREDICTION LOGIC |
|---|---|---|---|---|
| Home WiFi | Good | 07:30:05 | Mail/Web browsing | User home, network services used are OK |
| ID1 (3G) | Good | 07:35:25 | Web browsing/Music Streaming | Services used are OK |
| ID2 (4G) | Excellent | 07:38:35 | Video streaming | Next location with low bandwidth for services. Inform app/service about predicted quality ahead. Adapt buffer on streaming to 180 sec to cover for low bandwidth. |
| ID3 (2G) | Average | 07:42:00 | Video streaming | Video is buffered to cover for low bandwidth and for next location that has no coverage |
| No coverage | Bad | 07:44:00 | | Buffered video can be consumed by user. |
| ID5 (3G) | Good | 07:46:00 | Video streaming | Next location has low bandwidth. Inform appl. about predicted quality ahead. Download emails |
| ID6 (2G) | Average | 07:49:00 | Mail browsing | Mails are downloaded so that user can read emails |
| ID9 (3G) | Good | 07:53:00 | Music Streaming | Next location has low bandwidth. Inform app/service about predicted quality ahead. Change buffer on streaming to 60 sec. to cover for low bandwidth. |

TABLE-continued

USAGE PATTERNS-EXAMPLE (HOME TO OFFICE)

| LOCATION | QUALITY OF NETWORK INERFACE | TIME OF DAY | SERVICE/ APPLICATION | PREDICTION LOGIC |
|---|---|---|---|---|
| ID8 (2G) | Average | 07:57:00 | Music Streaming | Buffer music ahead so user can continue to consume the services. Next location office. WiFi network services OK |
| ID10 (4G) | Excellent | 08:00:00 | Voice call | Service used OK, read from past stored prediction data. |

Although the table above shows an example of route taking by the user from home to office, the embodiments herein are not restricted to this particular route.

Figure 2:
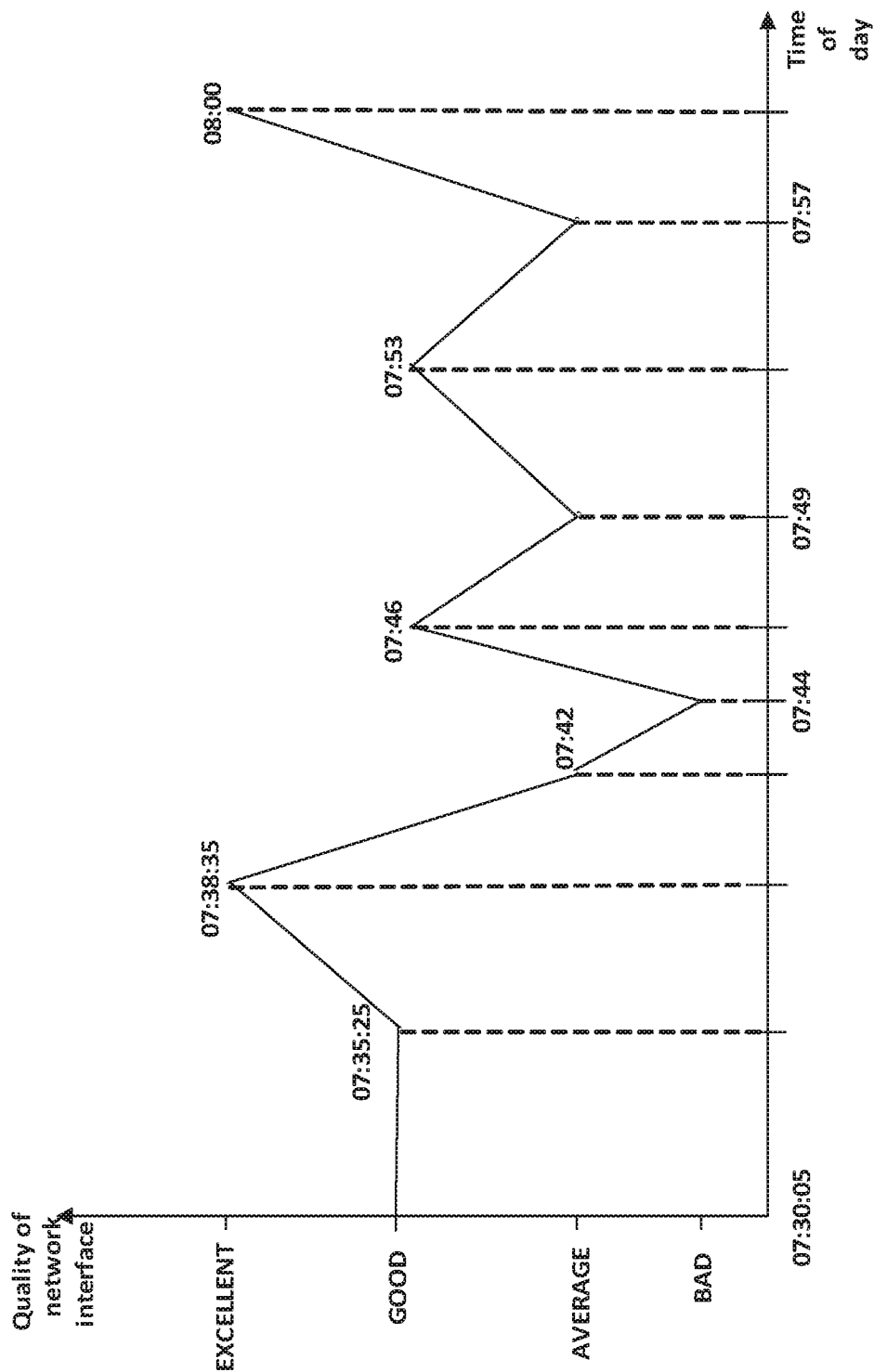
FIG. 2 is a diagram depicting the quality of the network interface vs. time of the day.

FIG. 2 is another interpretation of the information of the above table in terms of variations of the quality of the network interface as a function of time of day provided in the table. The quality of the network interface, denoted here QoNI, may be signal quality in dB or a bit or packet error rate etc. For example, a bad QoNI is less than 5 dB; average QoNI is between 5 and 10 dB; a good QoNI is between 11 and 20 dB; and an excellent QoNI exceeds 20 dB. Such QoNI is thus indicative of the predicted quality of the service or application. For example, if the next location, according to the usage pattern, is a "problem area (BAD)," i.e., having a QoNI that is less than 5 dB, the prediction logic is configured to notify the active service application of the deterioration of the QoNI so that to adapt the buffering time and/or pre-download web-pages or emails prior to entering "problem area". Again, the specifics of the application or service profile may also be taken into account. For the example above, in addition to the QoNI being predicted to be less than 5 dB, the required specific of the profile (e.g. latency) is also predicted to not be fulfilled (e.g., having low bandwidth or long latency). This information is used to notify the service or application to adapt the buffering time and/or pre-download web-pages or emails prior to entering the problem area.

Figure 3:
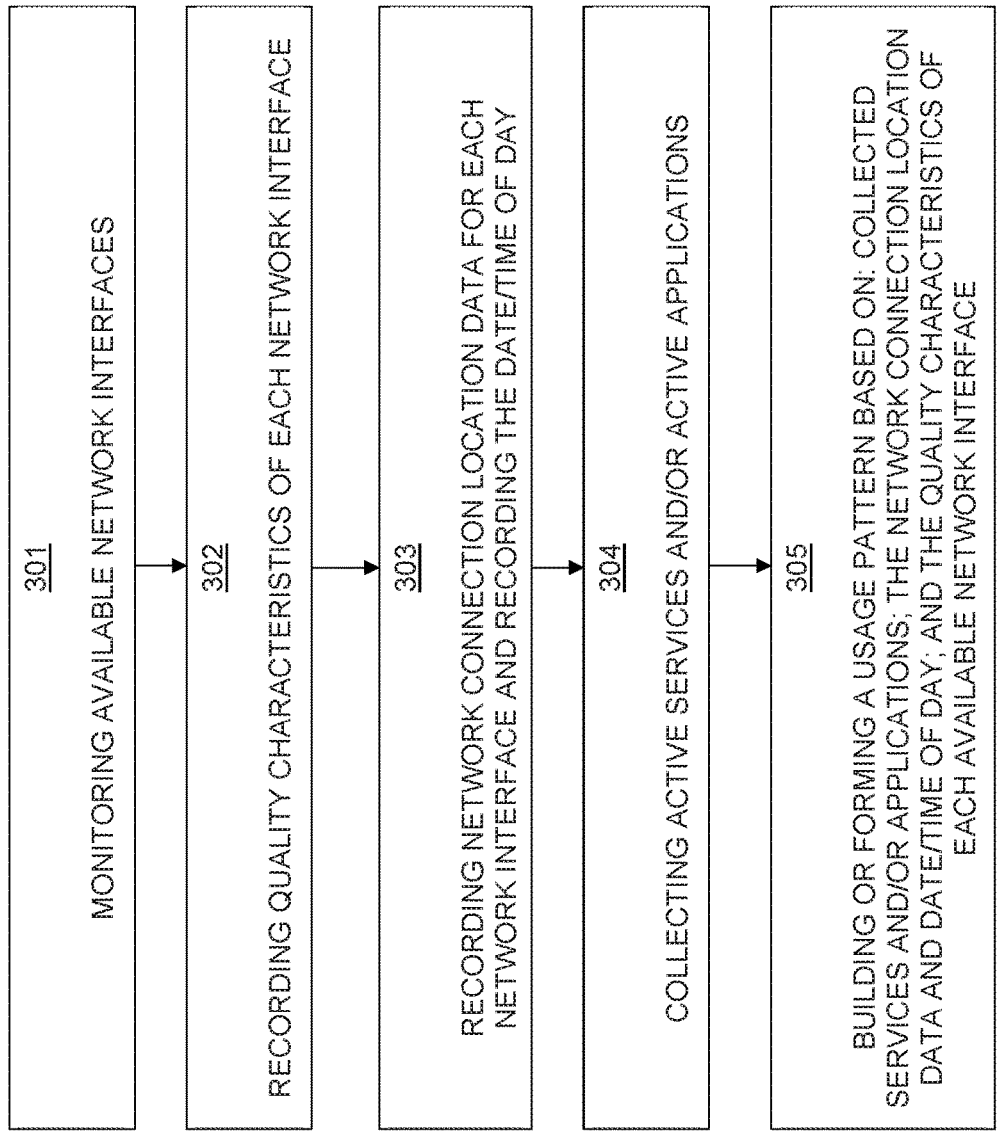
FIG. 3 illustrates a flowchart of a method performed by a mobile user terminal according to exemplary embodiments herein.

Referring to FIG. 3 there is illustrated a flowchart summarizing actions of a method performed in a mobile user terminal in accordance with the previously described embodiments. As shown, the method comprises:
(301) monitoring available network interfaces;
(302) recording quality characteristics of each available network interface;
(303) recording network connection location data for each network interface and further recording date and/or time of day;
(304) collecting user active service(s) and/or active applications(s), and
(305) building or forming a usage pattern based on: each collected user active service and/or active application; the recorded network connection location data and the recorded day/time of day; and the recorded quality characteristics of each monitored available network interface.

The method further comprises storing: the recorded quality characteristics; the recorded network connection location data; the recorded date/time of day; information on user active services and/or active applications, and the built or formed usage pattern for each user active service and/or application. This stored usage pattern information will then be used to predict the quality of a service(s) and/or application(s).

The method further comprises predicting quality of the user active services and/or active applications based on the built usage pattern and further based on a profile of the application(s) and/or services as previously described. The method further comprises adapting buffering time of said user active service(s) or active application(s) when the predicted quality of said user active service(s) and/or active application(s), based on the built usage pattern, is determined not to meet at least one requirement or specific of the application profile or service profile.

As an example, if the active service or application is video or music streaming and the predicted service/application quality in the area ahead, based on the built usage pattern, is determined not to meet at least one requirement of the application profile or service profile, the buffering time is increased to overcome the time between when the user is passing the "problem area" ahead to when the service or application can work without problem. Note that the network quality measurements or quality characteristics, e.g., signal quality, BER (bit error rate), etc. is also taken into account for the prediction as was described earlier.

It should be mentioned that a network provider generally knows that a certain coverage area has a certain quality (by network design) and how it may vary. This means that users in such a coverage area generally may experience some problems when entering the coverage area, which affects the quality of the service or application. Having this into consideration, the embodiments of the present invention advantageously overcome these problems for application/services such that predicting such areas allows taking appropriate actions prior to entering these coverage areas as previously described.

Figure 4:
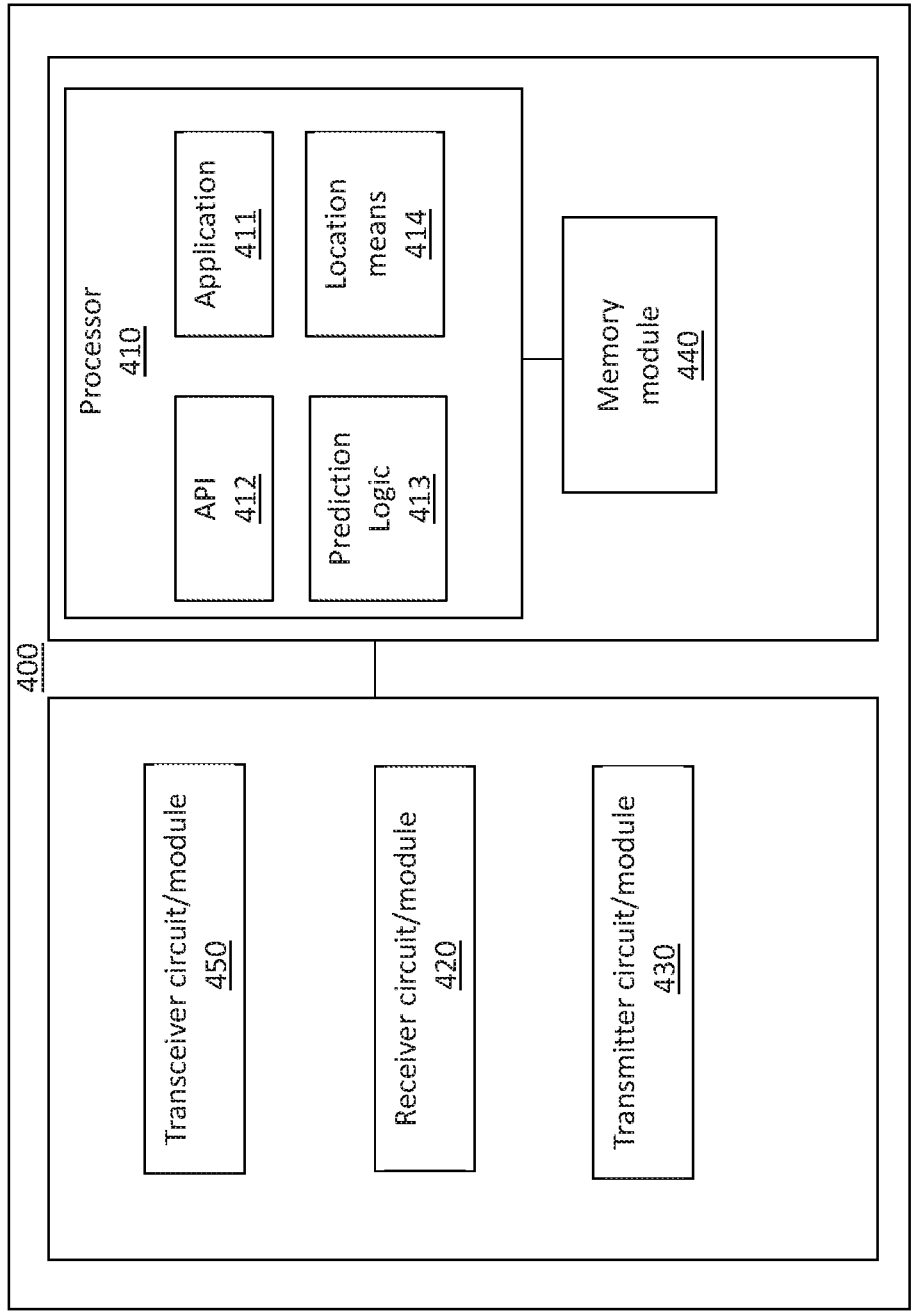
FIG. 4 depicts a block diagram of a mobile user terminal according to embodiments herein.

To perform the method described above, a mobile user terminal 400 is provided as depicted in FIG. 4. The mobile user terminal 400 comprises a processing circuit or a processing module or a processor 410; antenna circuitry (not shown); a receiver circuit or receiver module 420; a transmitter circuit or transmitted module 430; a memory module 440, and a transceiver circuit or transceiver module 450, which may include the transmitter circuit 430 and the receiver circuit 420.

The mobile user terminal may be a wireless device, a wireless terminal, a mobile station, a mobile telephone, a cellular telephone, or a smart phone. Further examples of different wireless devices comprise laptops with wireless capability, Laptop Embedded Equipment (LEE), Laptop Mounted Equipment (LME), USB (Universal Serial Bus) dongles, Customer Premises Equipment (CPE), modems, Personal Digital Assistants (PDA), or tablet computers, sometimes referred to as a surf plates with wireless capability, or simply tablets, just to mention some examples.

The processing module/circuit 410 includes a processor, microprocessor, an application specific integrated circuit (ASIC), field programmable gate array (FPGA), or the like, and may be referred to as the "processor 410." The processor 410 controls the operation of the mobile terminal 400 and its components. Memory (circuit or module) 440 includes a random access memory (RAM), a read only memory (ROM), and/or another type of memory to store data and instructions that may be used by processor 410. In general, it will be understood that the mobile terminal 400 in one or more embodiments includes fixed or programmed circuitry that is configured to carry out the operations in any of the embodiments disclosed herein.

In at least one such example, the mobile user terminal 400 includes a microprocessor, microcontroller, DSP (digital signal processor), ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the mobile user terminal operations disclosed herein. Further, it will be appreciated that the mobile terminal 400 may comprise additional components not explicitly shown in FIG. 4.

The mobile user terminal 400 maybe provided with an application 411 and an API (Application Programming Interface) 412 that interacts with the application 411 and with, e.g., a prediction logic 413, according to embodiments herein. The application 411, API 412 and the prediction logic 413 are controlled by the processor 410. The memory or storage 440 may also interact with the prediction logic 413 to store the information previously described. The processor 410 may further control location means 414 to determine the location of the mobile user terminal 400.

The mobile user terminal 400 by means of processor 410 is operative to monitor available network interfaces, record quality characteristics of each available network interface, record network connection location data for each available network interface, and further record the date/time of day; collect user active service(s) and/or active application(s), and build or form a usage pattern based on: each collected user active service and/or active application; the recorded network connection location data and the recorded date/time of day; and the recorded quality characteristics of each monitored available network interface.

The data information above, i.e., the recorded quality characteristics, the recorded network connection location data, the recorded date/time of day and information on user active service(s) and/or active application(s), and the built or formed usage pattern for each user active service or application, is stored in memory module 440. The data information may also be stored centrally in a network device as earlier described.

The prediction logic 413 may use the stored information to notify the application 411 or API 412 to, e.g., increase the buffering time of a service or application or to trigger download or web-pages or emails prior to the mobile user terminal 400 entering an area or cell where the service quality is not satisfactory (e.g., low signal quality based on the usage pattern and specific or requirement of a service or application not fulfilled) as previously described. Details have already been described and need not be repeated again.

There is also provided a computer program comprising instructions, which when executed on at least one processor 410 of the mobile user terminal 400 according to embodiments herein, cause the at least one processor 410 to carry out the method previously described. Also a carrier containing the computer program is provided, wherein the carrier is one of a non-transitory computer readable storage medium, an electronic signal, optical signal, or a radio signal.

Throughout this disclosure, the word "comprise" or "comprising" has been used in a non-limiting sense, i.e., meaning that consists at least of and element and may include more elements. Although specific terms may be employed herein, they are used in a generic and descriptive sense only and not for purposes of limitation. In particular, the embodiments herein may be applicable is any wireless systems, including 2G, 3G, 4G, 5G, WiMax, etc.

What is claimed is:

1. A method performed in a mobile user terminal, the method comprising:
    monitoring available network interfaces;
    recording quality characteristics of each available network interface;
    recording a time of day;
    recording network connection location data associated with the time of day, the network connection location data including a cell identification number to which each available network interface belongs or a network interface identification number for each available network interface, and a geographical location of the mobile user terminal;
    collecting information on a user active service or an active application;
    building or forming a usage pattern based on:
        each collected user active service or active application;
        the recorded time of day;
        the recorded network connection location data associated with the time of day, the network connection data including the cell identification number to which each available network interface belongs or the network interface identification number for each available network interface; and
        the recorded quality characteristics of each monitored available network interface;
    predicting quality of said user active service or active application based on the built or formed usage pattern, and further based on an application profile or service profile, when a user of the mobile user terminal is moving in a network topology comprising said available network interfaces; and
    buffering time of said user active service or active application when the predicted quality of said user active service or active application, based on the built usage pattern, is determined not to meet at least one requirement of the application profile or service profile.

2. The method according to claim 1 further comprising storing the recorded quality characteristics, the recorded network connection location data, the recorded time of day and information on the user active service or active application, and the built or formed usage pattern for each user active service or application.

3. The method according to claim 1 comprising, when a user active service or active application is music or video streaming, increasing the buffering time prior to entering an area or location, wherein predicted quality of the service or the application, based on the built usage pattern, is determined not to meet at least one requirement of the application profile or service profile.

4. The method according to claim 1 comprising, when a user active service or active application is web-browsing, pre-downloading web pages related to the user service or application prior to entering an area or location wherein predicted quality of the service or the application, based on the built usage pattern, is determined not to meet at least one requirement of the application profile or service profile.

5. The method according to claim 1 comprising, when a user active service or active application is an email application or an email service, pre-downloading at least one email for offline reading prior to entering an area or location wherein predicted quality of the service or the application, based on the built usage pattern, is determined not to meet at least one requirement of the application profile or service profile.

6. The method according to claim 1 wherein monitoring available network interfaces comprises monitoring network interfaces belonging to multi-radio access technologies including at least WiFi, 2G, 3G, 4G, 5G access technology network areas through which a user of the mobile user terminal passes or to which the mobile user terminal is connected.

7. The method according to claim 1 wherein recording quality characteristics of each available network interface comprises recording, during movement of the mobile user terminal and for each available network interface, at least one of: signal quality, bit error rate, network fault codes, jitter, lost data packages, application faults, latency, available bandwidth, and throughput.

8. A mobile user terminal comprising a processor and a memory, said memory containing instructions executable by the processor wherein the mobile user terminal is operative to:
    monitor available network interfaces;
    record quality characteristics of each available network interface;
    record a time of day;
    record network connection location data associated with the time of day, the network connection location data including a cell identification number to which each available network interface belongs or a network interface identification number for each available network interface, and a geographical location of the mobile user terminal;
    collect information on a user active service or an active application;
    build or form a usage pattern based on:
        each collected user active service or active application;
        the recorded time of day;
        the recorded network connection location data associated with the time of day, the network connection data including the cell identification number to which each available network interface belongs or the network interface identification number for each available network interface associated time of day; and
        the recorded quality characteristics of each monitored available network interface;
    predict quality of said user active service or active application based on the built or formed usage pattern, and further based on an application profile or service profile, when a user of the mobile user terminal is moving in a network topology comprising said available network interfaces; and
    buffer time of said user active service or active application when the predicted quality of said user active service or active application, based on the built usage pattern, is determined not to meet at least one requirement of the application profile or service profile.

9. The mobile user terminal according to claim 8 that is further operative to store the recorded quality characteristics, the recorded network connection location data, the recorded time of day and information on user active service or active application, and the built or formed usage pattern for each user active service or application.

10. The mobile user terminal according to claim 8 that is further operative to increase the buffering time of a user active service or user application, prior to entering an area or location wherein predicted quality of the service or the application, based on the built usage pattern, is determined not to meet at least one requirement of the application profile or service profile and wherein the user active service or user application is music or video streaming.

11. The mobile user terminal according to claim 8 that is further operative to pre-download web pages related to the user service or application, being web browsing, prior to entering an area or location wherein predicted quality of the service or the application, based on the built usage pattern, is determined not to meet at least one requirement of the application profile or service profile.

12. The mobile user terminal according to claim 8 that is further operative to pre-download at least one email for offline reading prior to entering an area or location wherein predicted quality of the service or the application, based on the built usage pattern, is determined not to meet at least one requirement of the application profile or service profile, wherein the service or application is an email service or application.

13. The mobile user terminal according to claim 8 that is operative to monitor network interfaces belonging to multi-radio access technologies including at least WiFi, 2G, 3G, 4G, 5G access technology network areas through which a user of the mobile user terminal passes or to which the mobile user terminal is connected.

14. The mobile user terminal according to claim 8 that is operative to record quality characteristics of each available network interface, during movement of the mobile user terminal and for each available network interface, wherein the quality characteristics include at least one of: signal quality, bit error rate, network fault codes, jitter, lost data packages, application faults, latency, available bandwidth, and throughput.

* * * * *